United States Patent
Madireddy et al.

(10) Patent No.: US 7,098,826 B2
(45) Date of Patent: Aug. 29, 2006

(54) AUTO-CONFIGURATION TO CONNECT TRANSMIT AND RECEIVE PORTS TO CORRESPONDING PORTS ON THE OTHER END IRRESPECTIVE OF CABLE CONNECTION MIS-MATCH

(75) Inventors: Subhash Madireddy, Bangalore (IN); Sudheer Prasad, Bangalore (IN); Baireddy Vijayavardhan, Medak (IN); Arthur Miller, Austin, TX (US); Krishnan Ramabhadran, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/904,748

(22) Filed: Nov. 25, 2004

(65) Prior Publication Data

US 2005/0270196 A1    Dec. 8, 2005

Related U.S. Application Data

(60) Provisional application No. 60/576,323, filed on Jun. 2, 2004.

(51) Int. Cl.
*H03M 1/00*    (2006.01)

(52) U.S. Cl. .................................. 341/141; 327/589
(58) Field of Classification Search ............. 341/141, 341/118; 327/536, 589
See application file for complete search history.

(56) References Cited

U.S. PATENT DOCUMENTS

| | | | | |
|---|---|---|---|---|
| 5,703,589 A | * | 12/1997 | Kalthoff et al. ............. | 341/172 |
| 5,995,033 A | * | 11/1999 | Roeckner et al. ........... | 341/155 |
| 6,072,355 A | * | 6/2000 | Bledsoe ...................... | 327/390 |
| 6,448,914 B1 | * | 9/2002 | Younis et al. ............... | 341/141 |
| 6,833,753 B1 | * | 12/2004 | Das ............................ | 327/536 |

* cited by examiner

*Primary Examiner*—Howard L. Williams
(74) *Attorney, Agent, or Firm*—Steven A. Shaw; W. James Brady; Frederick J. Telecky, Jr.

(57) ABSTRACT

An aspect of the present invention provides multiple switches in a transceiver, which enable pins provided for transmission and reception to be connected to either a transmit port or a receive port, as desired during operation. As a result, the transceiver can be auto-configured to connect the specific pin, on which signals are being received, to the receive port. Similarly, the transceiver can be auto-configured to connect the specific pin, on which the signals need to be transmitted, to the transmit port. Various design considerations in providing such switches are also described.

23 Claims, 5 Drawing Sheets

AUTO-CONFIGURATION TO CONNECT TRANSMIT AND RECEIVE PORTS TO CORRESPONDING PORTS ON THE OTHER END IRRESPECTIVE OF CABLE CONNECTION MIS-MATCH

RELATED APPLICATION(S)

The present application is related to and claims priority from co-pending U.S. provisional patent application entitled, "3.3V NMOS Switches for Implementing Auto MDIX feature in Ethernet Physical Layer", Filed on: Jun. 2, 2004, Ser. No.: 60/576,323, naming as inventors: Subhash Madireddy et al, and is incorporated in its entirety herewith into the present application.

BACKGROUND OF THE INVENTION

1. Field of the Invention

The present invention relates to transceivers used in Ethernet type cable based networks, and more specifically to a method and apparatus which enables auto-configuration of such transceivers to connect transmit and receive ports to corresponding ports on the other end irrespective of cable connection mis_match.

2. Related Art

Devices often contain transceivers (hereafter "transceivers") which transmit and receive signals on different paths (hereafter cables). To facilitate such transmission and reception, each transceiver generally contains a receive pin and a transmit pin. Thus, the receive pin is connected to one cable ("receive cable" merely for explanation) and the transmit pin is connected to another cable ("transmit cable").

Transceivers generally also contain a transmit port on which an internal circuit (transmit circuit) makes the signal available for transmission, and a receive port on which another internal circuit (receive circuit) receives a signal received from external sources.

In one prior approach, the transmit pin(s) and receive pin are respectively hardwired to the transmit port and the receive port, and a user is accordingly required to accurately (manually) connect the transmit cable to the transmit pin and the receive cable to the receive pin. A cable connection mis-match is said to occur when the receive pin is connected to the transmit cable, and the transmit pin is connected to the receive cable.

A cable connection mis-match may be undesirable for several reasons. For example, in the case of Ethernet twisted pair cables connecting two devices (e.g., two repeaters or network interface card with a repeater) according to the above-noted prior approach, the transmit pin of one device is to be connected to the receive pin of the device at the other end by a cable. A mis-match may render the two devices non-operational, at least until the connections are switched.

Accordingly, at least to reduce the complexity of deploying the devices, there has been a generally felt need to auto-configure transceivers such that transceivers would be operable irrespective of the connection of the cables to the pins. In other words, the internal implementation within a transceiver would be automatically (re)configured in case of a wrong connection, to automatically (without manually switching the cables) cause the devices to communicate.

In one prior auto-configuration approach, substantial portion of the transmit and receive circuits are replicated at each pin and only either transmit or receive circuit is used at a pin (at a given time instance) depending on the cable connected.

One problem with such an approach is increased area requirements and possibly additional exposure to failure due to the increased number of components. At least for such reasons, the prior auto-configuration approach may not suitable in several environments.

What is therefore required is an improved method and apparatus which enables auto-configuration of such transceivers to connect transmit and receive ports to corresponding ports on the other end irrespective of cable connection mis_match.

BRIEF DESCRIPTION OF THE DRAWINGS

The present invention will be described with reference to the following accompanying drawings.

DETAILED DESCRIPTION OF THE PREFERRED EMBODIMENTS

1. Overview

An aspect of the present invention provides multiple switches in a transceiver, which enable pins provided for transmission and reception to be connected to either a transmit port or a receive port, as desired during operation.

As a result, the transceiver can be auto-configured to connect the specific pin, on which signals are being received, to the receive port. Similarly, the transceiver can be auto-configured to connect the specific pin, on which the signals need to be transmitted, to the transmit port.

Consequently, a user may connect either a transmit cable or a receive cable to any pin, and the transceiver is automatically configured for appropriate operation. In addition, such auto-configuration feature may be implemented without replicating various transmitter and receiver components in the transceiver, thereby minimizing area requirements.

Various aspects of the present invention further complement the above noted configuration, as described below.

An aspect of the present invention reduces the on resistance (i.e., the resistance offered by the transistor in an on state) of a transistor used in the switches by providing a charged capacitor (example implementation of a boost circuit) connected between the gate and source terminals of the transistor. The capacitor is charged to provide a voltage substantially greater than the threshold voltage of the transistor, but less than the maximum permissible voltage.

Due to the resulting high Vgs (gate to source voltage), the on resistance is reduced. The reduced on resistance reduces the attenuation of the input signal, which may result otherwise. In addition, the on resistance is independent of (i.e., does not change with) the voltage level of the input signal connected to the source terminal, since a change in the voltage level on the source terminal would also reflect on the gate terminal (due to the presence of the charged capacitor). Thus, distortions, which may otherwise result if the resistance were varying, are avoided.

Another aspect of the present invention provides a charge circuit which charges the capacitor periodically when the switch containing the transistor is in the on state. Due to such periodic charging, Vgs remains substantially constant even if there is leakage of charge from capacitor.

One more aspect of the present avoids/reduces gate oxide deterioration (which could occur due to application of high cross terminal voltages) of a transistor in a switch when in off state. Such a feature is achieved in the case of NMOS transistors by connecting the gate terminal to a voltage greater than 0 volts but substantially equaling Vt (threshold voltage).

Yet another aspect of the present invention reduces the channel hot carrier (CHC) problem (with respect to NMOS transistors) which could occur when both Vgs and Vds are of high value when a transistor transitions from a on state to off state. Such a reduction is obtained by connecting a resistor in series with a drain terminal of the transistor (in the switch). The voltage drop across the resistor leads to a corresponding reduction in the Vds value, which causes Vds to be of a low value while Vgs transitions to a low value. CHC problem is reduced as a result.

Another aspect of the present invention reduces cross talk interference between transmit and receive paths in a differential mode of operation, by connecting both positive and negative signals (receive or transmit) to each port. The interference signal (and thus the cross talk) through the off switches is canceled as a result.

One more aspect of the present invention provides common mode voltages to both analog to digital converter (ADC) and digital to analog converter (DAC) of a transceiver independent of whether the switches are configured for straight connection or for cross connection, without exposing transistors in the switches to cross terminal voltages higher than the maximum permissible voltages. Such a feature is obtained in an embodiment by connecting the center tap of each of the two transformers through a corresponding resistor to a supply voltage Vdd, and also connecting the two center taps to each other. A zener diode is also connected to the center taps to ensure that the voltage provided to the transistors does not exceed a desired threshold.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Example Devices

Figure 1A:
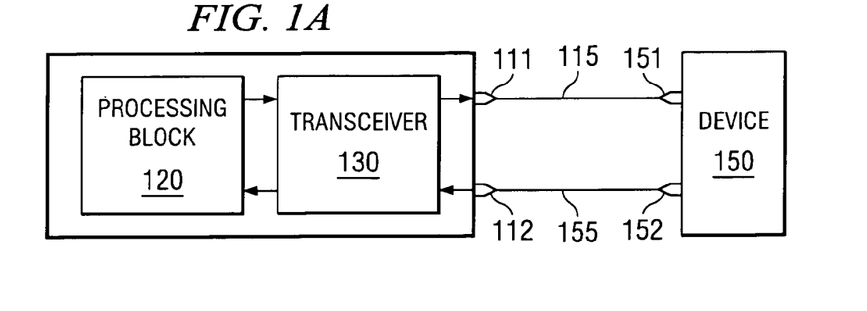
FIG. 1A is a block diagram illustrating a straight connection between two devices, in which various aspects of the present invention can be implemented.
Figure 1B:
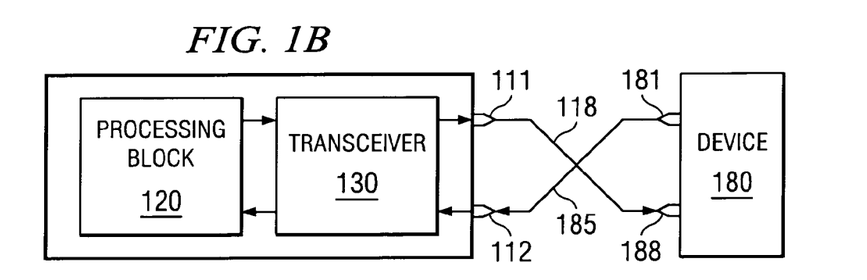
FIG. 1B is a block diagram illustrating a cross connection between two devices, in which various aspects of the present invention can be implemented.

FIGS. 1A and 1B are diagrams illustrating two different possibilities of connections between two example devices. In particular, FIG. 1A illustrates a straight connection and FIG. 1B illustrates a cross connection between devices. Both Figures are shown containing devices 110, which in turn is shown containing processing block 120 and transceiver 130. The other devices may also contain similar block, but are not described (and not shown in Figures as well) for conciseness.

Processing block 120 may generate digital data to be transmitted by transceiver 130. Processing block 120 may also receive digital data (for further processing) from transceiver 130. Transceiver 130 converts the digital data received from processing block 120 into appropriate signals for transmission on transmit pin(s) 111. Similarly, transceiver 130 converts the signals received on receive pin(s) 112 into digital data, and forwards the digital data to processing block 120.

Continuing with reference to FIG. 1A containing devices 110 and 150, transmit pin(s) 111 of device 110 and receive pin(s) 151 of device 150 are shown physically disposed/located at a higher position compared to the respective other pin. Thus, receive pin 112 of device 110 and transmit pin 152 are shown at lower positions (compared to pins 111 and 151 respectively).

The transmit pin on one device needs to be connected to the receive pin on the other device. Accordingly, cable 115 is shown connecting transmit pin 111 to receive pin 151, and cable 155 is shown connecting transmit pin 152 to receive pin 112. The connections of the cables is referred to as a 'straight connection' since the cables are not crossing over.

FIG. 1B shows a scenario in which cross connection is required since transmit pin 181 of device 180 is shown located above receive pin 188. On the other hand, as in FIG. 1A, transmit pin 152 of device 150 is located below receive pin 151. Thus, cables 118 and 185 need to be connected in a cross connection configuration, as shown.

At least due to manual errors, the cables may be erroneously connected (i.e., a user using cross connection with respect to the requirements of FIG. 1A, and using a straight connection with respect to the requirements of FIG. 1B). Considerable time and effort may be spent in detecting and fixing such problems while devices are being deployed in large numbers.

Accordingly, at least to reduce the complexity of deploying the devices, transceivers may need to be auto configured to be operable irrespective of the connection of the cables to the pins. One embodiment of auto configuration according to an aspect of the present invention is described below with reference to FIGS. 2 and 3.

3. Auto Configuration of Transceivers

Figure 2:
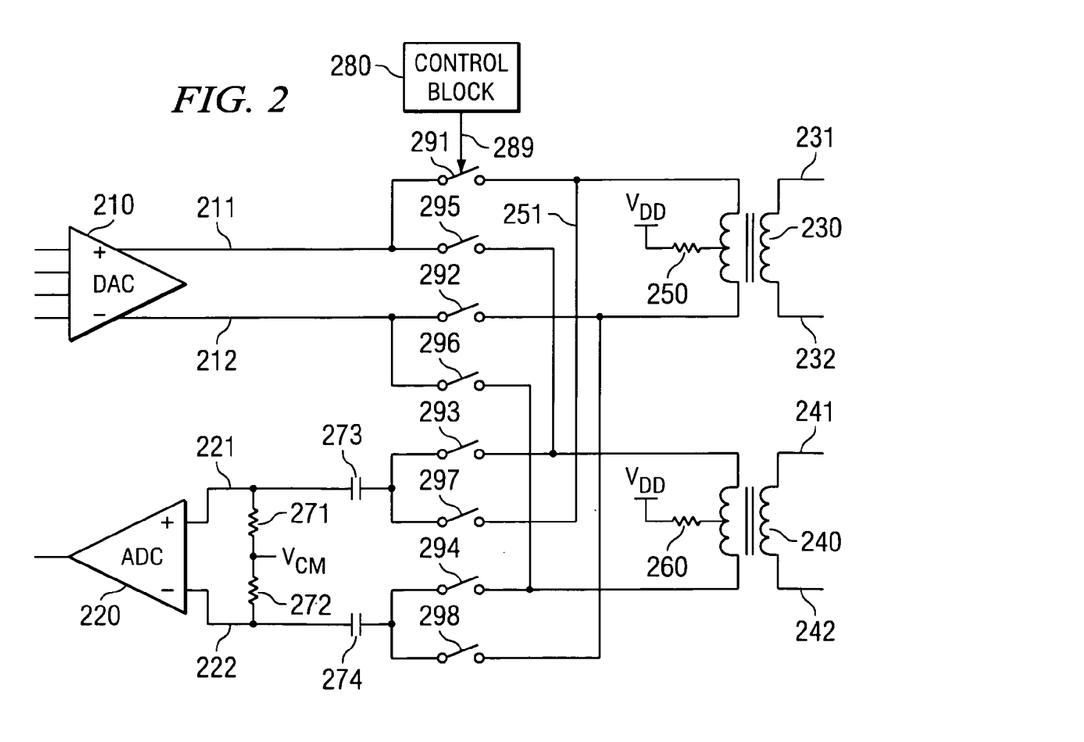
FIG. 2 is a block diagram illustrating the relevant details of a transceiver implemented according to various aspects of the present invention.
Figure 3:
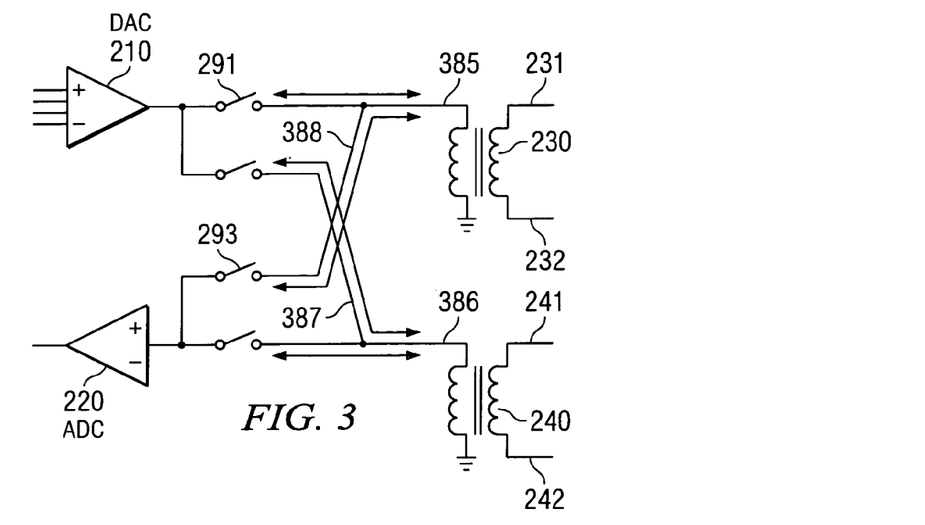
FIG. 3 is a block diagram illustrating the straight and cross connection configurations within a transceiver provided according to an aspect of the present invention.

FIGS. 2 and 3 are logical diagrams illustrating the details of auto-configuration of transceiver 130 according to an aspect of the present invention. For illustration, the features are described with respect to transceiver 130, however, various aspects of the present invention can be implemented in other devices as well. Transceiver 130 is shown containing digital to analog converter (DAC) 210, analog to digital converter (ADC) 220, transformers 230 and 240, resistors 250, 260, 271, and 272, capacitors 273 and 274, control block 280, and switches 291 through 298. Each component is described below.

In brief, DAC 210 forms a (portion of) transmit circuit and ADC 220 forms a receive circuit in transceiver 130. Paths 211 and 212 represent the transmit ports (in differential mode of operation), and paths 221 and 222 represent the receive ports internal to transceiver 130. Paths 231 and 232 represent the transmit pins contained in pins 111, and paths 241 and 242 represent the receive pins contained in pins 112 of FIG. 1.

In a prior embodiment, transmitting cable which is connected to transmitting pins 231/232 needs to be connected to receiving ports 221/222 (cross connection) or transmitting ports 211/212 (straight connection) according to the configuration of the transceiver in the other end device (150). Instead of manually changing the cable connections, switches 291 through 298 can be configured (auto-configured) to provide the connections as desirable according to various aspects of the present invention, as described below.

Transformer 230 is connected to pins 231 and 232 on one side, and to switches 291/292 in straight connection configuration and to switches 297/298 in cross connection configuration on the other side. Similarly, transformer 240 is connected to pins 241 and 242 on one side, and to switches 293/294 in straight connection configuration and to switches 295/296 in cross connection configuration on the other side. As a result, each of transformers 230 and 240 either transmits or receives signals on cable connected to corresponding respective pins 231/232 and 241/242 at any given instance of time according to the desired configuration.

The center tap of each transformer 230 and 240 is connected to Vdd through respective resistors 250 and 260, which provide common mode voltage to DAC 210 while in transmitting operation. However, for receiving operation, common mode voltage is not required at transformer 230/240 since the D.C. component in the received signal is blocked (by capacitors 273/274) before the signal is provided as an input to ADC 220.

Capacitors 273 and 274 block D.C. component in the received signals and provides the A.C. coupled signal to ADC 220. Resistors 271 and 272 provide the required common mode voltage to ADC 220 based on Vcm received at the junction of the two resistors. Vcm is provided as such since the D.C. components are otherwise blocked by capacitors 273 and 274.

DAC 210 generates analog signal on paths 211 and 212 to be transmitted on transmit cable. Signals on paths 211 and 212 are complementary to each other. ADC 220 receives (and samples) signals on paths 221 and 222, which are also complementary to each other.

Control block 280 generates control signal on path 289 to control the turn on/off of switches 291–298 based on the required configuration (i.e., to auto-correct any cable connection mismatches). For present purposes, it is assumed that some other component determines whether any auto-correction is required (or the desired configuration of various switches 291–298), and control block 280 generates the appropriate control signals.

Either of witches 291 and 295 turns on (under the control of control block 280) at any time instance to connect signal on path 211 to transmitting pin 231 or receiving pin 241 based on the control signal received on path 289 (which would be connected to each of the switches 291–298, though not shown in the Figures). Turning on of switch 291 causes signal 211 to be connected to 231 (straight connection) and turning on of switch 295 causes signal 211 to be connected to 241 (cross connection). Similarly, signal 212 is connected through switches 292 and 296 either in straight connection or cross connection respectively based on control signal 289.

Switches 293, 294, 297 and 298 are similarly turn on/off based on the control signal received on path 289 to provide straight connection or cross connection of the received signal, as further described below with reference to FIG. 3.

FIG. 3 illustrates the straight connection and cross connection between ADC 220, DAC 210, transformers 230 and 240. Path 385 represents a straight connection between DAC 210 and transmitting pins of transformer 230, and path 386 represents a straight connection between ADC 220 and receiving pins of transformer 240. The straight connections are attained by turning on switches 291–294, and turning off switches 295–298.

Paths 387 and 388 respectively illustrate cross connection between DAC 210 and receiving pins of transformer 240 and cross connection between ADC 220 and transmitting pins of transformer 230 by appropriately turning on/off of corresponding switches. The cross connections are attained by turning off switches 291–294, and turning on switches 295–298.

From the above, it may be appreciated that a cable connection mis-match may be auto-corrected by configuring the switches for one of the cross connection configuration or straight connection noted above. However, the presence of the switches would cause one or more problems as described below.

4. Problem(s) With Switching Logic

It may be noted that switches are often implemented using MOS transistors in integrated circuits. In particular, NMOS transistors are often preferred over PMOS transistors (for implementing switches) due to the higher speed and lower on resistance. The corresponding implementations may cause one or more problems as described below.

Problem 1: Since switches 291 through 298 of FIG. 2 are in series path of signal (to be processed), the on resistance of transistors/switches may cause attenuation of signal level. To avoid attenuation, the on resistance needs to be low. In one embodiment, for a reliable operation, the on resistance in transmitting path is 1 ohm and in receiving path is of 2.5 ohms. Large size transistors may need to be implemented to obtain such low values of resistance, which requires more area. In addition, large size transistors offer more parasitic capacitance, which causes more delays in processing the signals (thereby impeding the throughput performance.

Problem 2: The on resistance of transistors would change with the change in the signal level since voltage across gate to source (Vgs) would change with the change in the signal. Such a change in the value of resistance may cause distortion/non-linearity of the signal.

Problem 3: Due to the magnetic effects of transformers 230/240, the voltage level of the signals received/transmitted could be higher than the power supply Vdd. Such high voltages may be presented across the terminals of low voltage transistors, causing the break down of transistors in the long run. The problems would be of particular concern if MOS transistors are implemented to operate with low cross-terminal voltages since transceivers may be designed to transmit/receive signals with high voltages.

Problem 4: For receiving operation, the signal is AC coupled and no D.C. current flows through switches and resistor 260/250 connected to center tap of transformer. As a result, when there is no received signal, switches in receiving path would see supply voltage Vdd. If a signal is present, then the voltage on switches may change by a similar amount with reference to Vdd. For example, if the voltage swing of the signal is Vswing, then switches would receive Vdd+Vswing, which is a high voltage and thus causes break down of transistors in switches. In addition, the switches may not be turned on if high voltage (Vdd+Vswing) is received on source terminal, which is greater than the voltage on gate terminal by more than the transistor threshold voltage.

Problem 5: Channel hot carrier (CHC) occurs when both Vgs and drain to source voltage (Vds) of a transistor are high voltages simultaneously since the high voltage (high electric field) of Vds and Vgs may cause carriers to be passed to gate oxide. CHC is undesirable since the flow of carriers into gate oxide causes change of threshold voltage after a long time. Such a situation occurs when a transistor switches from off state to on state, as described in sections below.

Problem 6: Cross-talk due to the switches in the off-state is another aspect of concern. Cross-talk generally refers to the interference caused by one of the transmit and receive signals on the other signal. The switches in the off state may cause cross-talk due to the presence of the coupling capacitance, gate resistance and bulk resistance, as described in further detail in sections below.

The manner in which one or more of the problems noted above may be addressed according to various aspects of the present invention, is described below.

5. Principle of Boost Circuit

Figure 4:
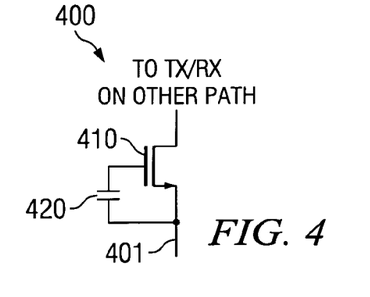
FIG. 4 is a circuit diagram illustrating the principle of a boost circuit according to an aspect of the present invention.

FIG. 4 is a circuit diagram illustrating a principle to address problems 1, 2 and 3 (noted above) in one embodiment. Switch 400 is shown containing NMOS transistor 410 and capacitor 420. Switches 291 through 298 of FIG. 2 may be implemented similar to switch 400. Transistor 410 is connected in signal path either in transmitting or receiving path. Source terminal of transistor 410 receives signal on path 401 and drain terminal is connected to the TX/RX on the other path. Capacitor 420 is connected between source terminal and gate terminal of transistor 410.

Capacitor 420 is pre-charged to a maximum voltage (substantially more than the threshold voltage of transistor 410, but less than the maximum permissible voltage). As a result, transistor 410 is turned on when capacitor 420 is pre-charged. The turning on of transistor 410 causes switch 400 to operate in a closed state. Capacitor 420 may then be disconnected to turn off transistor 410, causing switch 400 to operate in the open state.

It should be understood that capacitor 420 represents an example implementation of a boost circuit. In general, any approach which provides a (substantially) constant voltage for a long time can be used for the boost circuit. Use of such a boost circuit overcomes several of the problems, as described below.

Problem 1, noted above, may be addressed since the on resistance of transistor 410 would be reduced due to the high Vgs caused by the pre-charging. Such a pre-charging may be referred to as boosting of gate since capacitor 420 is connected to the gate terminal. As noted above, a low on resistance reduces the attenuation of the signal. By designing the maximum voltage to be less than the maximum permissible voltage of Vgs, the gate-oxide break down may be avoided.

Problem 2 may also be addressed by such a connection of capacitor 420 since Vgs of transistor 410 does not change with the change in signal 401. As capacitor 420 is pre-charged and the gate terminal does not receive any other voltages, a change in signal 401 on source terminal is reflected on to gate terminal. For example, capacitor 420 is pre-charged to 3.6V and signal level 401 is 2.0V, then the voltage on gate terminal equals (3.6+2.0)V. In effect, the voltage across gate and source terminals would remain same as the voltage for which capacitor 420 is pre-charged. As a result, a change in signal 401 does not change Vgs, which thus avoid non-linearity/distortion of signal.

From the above, it may be appreciated capacitor 420 needs to be charged (for on state) and disconnected from transistor 410 (for off state). Accordingly, additional circuitry needs to be implemented for such charging and disconnecting. The circuitry may be implemented to meet other challenges as well. For example, capacitor 420 discharges slowly when in on state, which causes reduction in Vgs over a long time. Such a decrease in charge may be addressed by periodically charging capacitor 420 as described below with reference to FIG. 5.

6. Schematic of Boost Circuit

Figure 5:
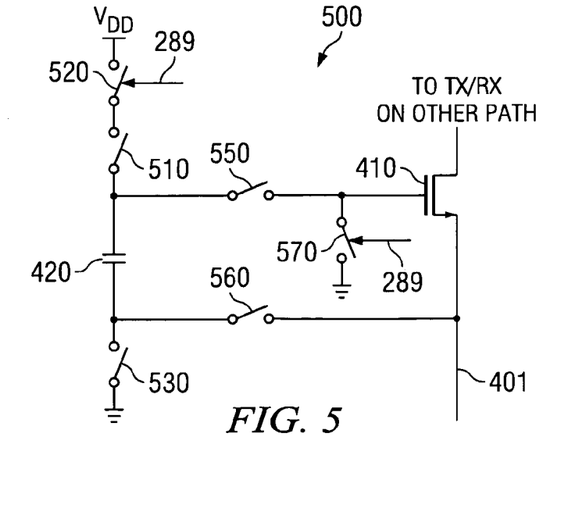
FIG. 5 is a schematic diagram illustrating the details of a boost circuit in one embodiment.

FIG. 5 is a schematic diagram illustrating the details of boost circuit 500 in an embodiment of the present invention. Boost circuit 500 is shown containing transistor 410, capacitor 420, and switches 510, 520, 530, 550, 560 and 570. Each component is described below.

Switches 510, 530, 550 and 560 are controlled by a clock signal (not shown) with two phases. Phase 1 of the clock signal turns on switches 510 and 530, and turns off switches 550 and 560. Phase 2 of the clock signal turns off switches 510 and 530, and turns on switches 550 and 560. The rate at which switches are turned on/off depends on the frequency of the clock signal, which is determined by the amount of leakage of capacitor 420. The frequency of the clock signal can be low, but needs to be enough to ensure that the charge on capacitor 420 would remain substantially same (to provide the constant voltage, as desired).

During phase 1, capacitor 420 charges to Vdd when switches 510 and 530 are turned on. In addition, switches 550 and 560 are turned off, causing capacitor 420 to be disconnected from transistor 410. However, the charge on internal/inherent gate to source capacitance (not shown) of transistor 410 provides the required Vgs to transistor 410 such that transistor 410 is in the on state in the duration capacitor 420 is being charged. It should be understood that the various components operate as a refresh circuit, which charges the capacitor to provide the desired constant voltage.

During phase 2, capacitor 420 (with charge accumulated in phase 1) is connected across gate and source terminals of transistor 410 when switches 550 and 560 are turned on. The diminished charge on capacitor 420 during phase 2 due to leakage, is replenished as capacitor 420 is charged during phase 1.

Switches 520 and 570 are controlled by control signal 289. Control signal 289 controls turning on/off of switches 520 and 570 based on the requirement of straight connection or cross connection. At any given time, one of switches 520 and 570 is on and the other one is off. Turning on of switch 520 provides Vdd to transistor 410, which causes transistor 410 to be turned on. Turning on of switch 570 pulls gate terminal of transistor 410 to ground, which causes transistor 410 to be turned off.

In one embodiment, each of switches 510, 520, 530, 550, 560 and 570 is implemented using a single NMOS transistor. However, at least some of the problems (1 to 6) noted above may be applicable to switches 550, 560 and 570. Accordingly, more complex circuits may be used for switches 550, 560 and 570 as described below with an example.

7. Implementation of Boost Circuit

Figure 6:
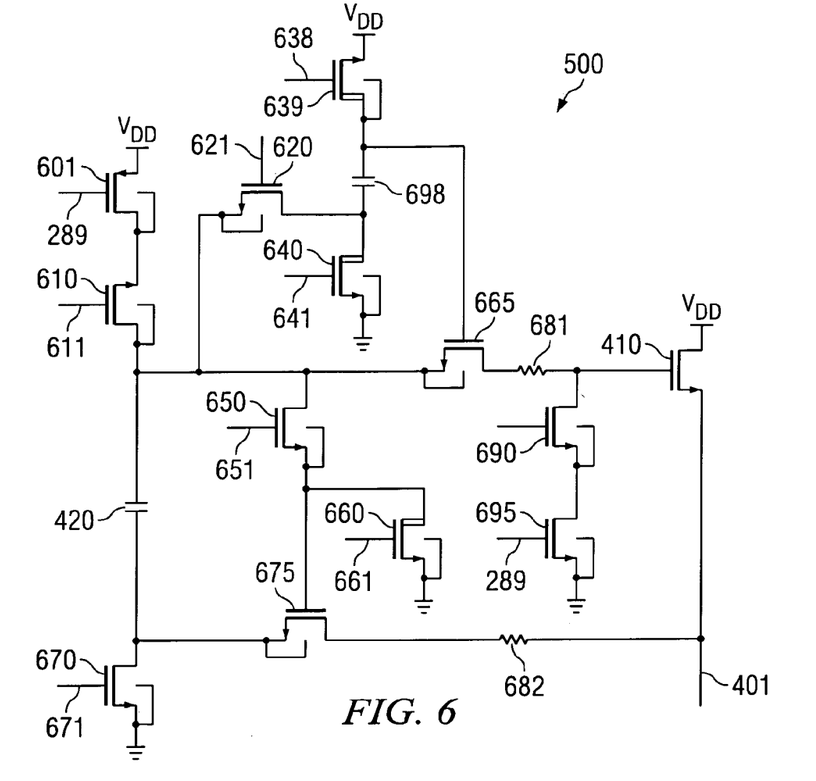
FIG. 6 is a circuit diagram illustrating various improvements to the boost circuit in one embodiment.

FIG. 6 is a circuit diagram illustrating the implementation details of boost circuit 500 in an embodiment of the present invention. Boost circuit 500 is shown containing capacitor 420, PMOS transistor 601, and NMOS transistors 410, 610, 620, 639, 640, 650, 660, 665, 670, 675, 690 and 695. Each component is described below.

PMOS transistor 601 operates as switch 520, which turns on when signal 289 is low and causes Vdd to be provided to boost circuit 500. When signal 289 is low, the clock signals (now shown) controlling switches 510, 530, 550 and 560, are enabled, which causes capacitor 420 to be charged, and in turn causing transistor 410 to be turned on.

NMOS transistors 690 and 695 together operate as switch 570. Transistor 690 is always turned on since the gate terminal is connected to Vdd. The voltage drop across transistor 690 shields transistor 695 from exposure to high voltage levels. Transistor 695 is turned on when signal 289 is high and causes gate terminal of transistor 410 to be pulled to ground to cause transistor 410 to be turned off. In addition, all the clock signals (which are described above as controlling switches 510, 530, etc.) are disabled, thereby disconnecting capacitor 420 from transistor 410. Thus, transistor 410 is turned off, as desired, when switch 570 is closed.

Transistor 670 operates as switch 530 and the gate terminal of transistor 670 is connected to a clock signal with a voltage swing between 0 and Vdd. Since source terminal of transistor 670 is connected to ground, applying maximum voltage of Vdd may ensure that transistor 670 is not exposed to a voltage greater than the maximum permissible voltage.

Transistor 610 operates as switch 510 and the gate terminal of transistor 610 is connected to a clock signal with a voltage swing between Vdd and 2*Vdd. Since source terminal of transistor 610 is connected to Vdd through transistor 601, applying maximum voltage of 2*Vdd may ensure that transistor 610 is not exposed to a voltage greater than the maximum permissible voltage. During phase 1 of the clock signal, gate terminals of transistors 610 and 670 will be at 2*Vdd and Vdd respectively, and thus transistors 610 and 670 will be turned on to cause capacitor 420 to be charged to Vdd.

Transistors 650, 660 and 675 together operate as switch 560. As may be appreciated from FIG. 4, switch 560 receives signal 401, and is thus in the signal path. Transistor 660 turns on during phase 1 of clock signal and the gate terminal of transistor 660 is connected to the clock signal changing between 0 and Vdd, which pulls gate terminal of transistor 675 to ground. Such a pulling causes transistor 675 to be turned off during phase 1 as desired.

Transistor 650 turns on during phase 2 of clock signal and the gate terminal of transistor 650 is connected to the clock signal changing between 0 and 2*Vdd. Transistor 650, when turned on, causes capacitor 420 to be connected across the source and gate terminals of transistor 675 and thus avoids problems 1 and 2 noted above.

Transistors 620, 639, 640, and 665, and capacitor 698 together operate as switch 550. Switch 550 is also dependent on signal 401 and implementing using single transistor 665 may cause problems 1 and 2 as noted above since source terminal of transistor 665 is signal dependent (which can receive Vdd+Vsignal). The principle of FIG. 5 may be used to provide the desired voltage to gate terminal of transistor 665 by boosting the source terminal of transistor 665, as described below in detail.

Capacitor 698 charges to Vdd by turning on transistors 639 and 640 during phase 1 of clock signal. Such a connection pulls the gate terminal of transistor 665 to ground, which causes transistor 665 to be turned off during phase 1 as desirable (for switch 550 to be turned off). The gate terminals of transistors 639 and 640 respectively swings between Vdd and 2*Vdd, and 0 and Vdd similar to transistors 610 and 670.

Transistor 620 turns on during phase 2 by receiving a clock signal with a voltage swing between 0 and 2*Vdd. Turning on of transistor 620 connects capacitor 698 across the gate and source terminals of transistor 665, which causes transistor 665 to be turned on as desired (for switch 550 to be turned on during phase 2).

It may be noted that transistors 639, 698, and 660 can be implemented as a drain extended NMOS (DENMOS) transistors since transistors 639, 698, and 660 are present in the path of signal. As is well known, DENMOS transistor can withstand high voltages and however offers high resistance. Thus, DENMOS transistors are not used in signal path and are used for transistors 639, 698, and 660 to withstand high voltages. Resistors 681 and 682 may be used to prevent channel hot carrier problem 5, as is further described in sections below.

When transistor 695 is turned on, the voltage on gate terminal of transistor 410 is pulled to zero (due to connection to ground). The maximum voltage level of signal 401 would cause maximum voltage to be presented across gate and source terminals of transistor 410, which causes gate oxide integrity problem for transistor 410. The manner in which the gate oxide may be protected is described below with reference to FIG. 8 below. First a timing diagram illustrating the relationship of various clock signals used in FIG. 7, is described briefly below.

Figure 7:
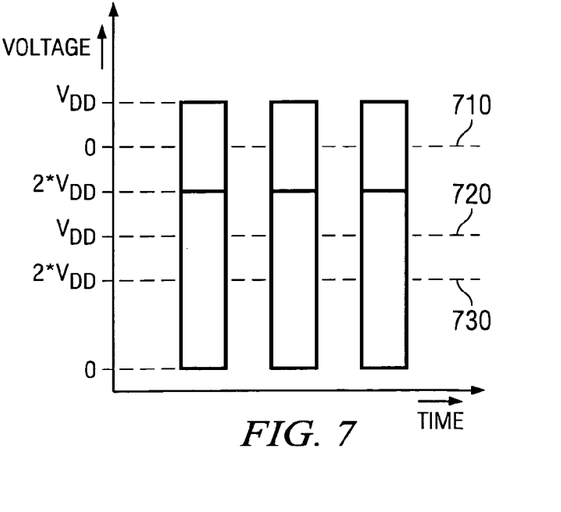
FIG. 7 is a timing diagram illustrating the details of various clock signals supplied to the gate terminals of transistors used in a transceiver in an embodiment of the present invention.

FIG. 7 is a timing diagram illustrating the details of clock signals provided on gate terminals 611, 621, 638, 641, 651, 661, and 671. Line 710 represents the clock signals on paths 671, 641 and 661, line 720 represents the clock signals on paths 611 and 638, and line 730 represents the clock signals on paths 621 and 651.

As may be appreciated, the clock signals on paths 611, 671, 638, 641, and 661 are at logic high in Phase 1, and the remaining clock signals on paths 621 and 651 are a logic high in Phase 2 (i.e., out-of-phase by 180 degree compared to the clock signals on paths 611, etc.). In addition, the clock signals on paths 671, 641 and 661 swing between 0 and Vdd, clock signals on paths 611 and 638 swing between Vdd and 2*Vdd, and clock signals on paths 621 and 651 swing between 0 and 2*Vdd, wherein '*' represents the multiplication operation.

In addition to addressing problems 1 and 2 as described above, the circuit of FIG. 6 may also address problem 3 as described now. As noted above, the transistors in switches 550 and 560 could be exposed to greater than maximum permissible cross terminal voltages due to the operation of magnetic effects of transformers 230 and 240. The manner in which the approach of FIG. 7 avoids application of high undesirable voltages across each transistor supporting switches 550 and 560, is described below.

With respect to transistor 675 (supporting switch 560), the drain terminal of transistor 675 is connected to receive signal 401, which may be at unacceptably high voltage.

Capacitor 420 is charged to maximum voltage of Vdd, and is applied between the gate and source terminals of transistor 675. Also, the voltage on gate terminal of transistor 675 equals (Vdd+voltage level of signal 401). As a result, Vdg equals (Vdd), which implies that the cross terminal voltages Vds and Vgd are within maximum permissible voltage level, even though drain terminal receives greater than the maximum permissible voltage level.

With respect to transistor 650 (supporting switch 560), the application of clock signal having a voltage level of (2*Vdd) ensures that the Vgs of transistor 650 is greater than Vt, in the durations transistor 675 needs to be turned on. In addition, the Vgs of transistor would be less than Vdd in such durations since the gate terminal is at (2*Vdd), and the source terminal would be at (Vdd+signal level on path 401, which would be less than Vdd).

By similar reasoning, it may be readily appreciated that problem 3 is avoided with respect to transistors 620, 639, 640 and 665, which support switch 550. The description is continued with reference to the manner in which gate oxide problems can be avoided in relation to transistor 410.

8. Avoiding Gate Oxide Integrity Problems

Figure 8:
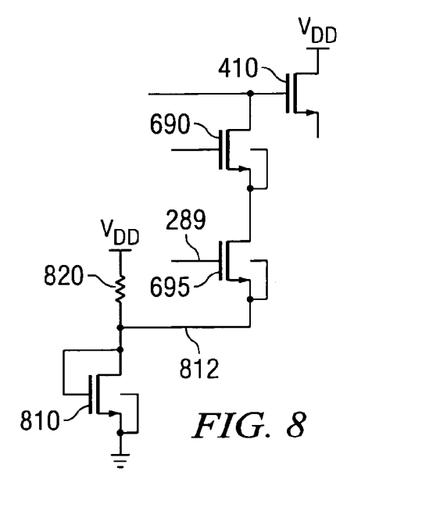
FIG. 8 is a circuit diagram illustrating the manner in which gate oxide integrity problem can be avoided in a transceiver provided according to an aspect of the present invention.

FIG. 8 is a circuit diagram illustrating the manner in which gate oxide integrity problems are avoided in an embodiment of the present invention. Circuit 800 is shown containing NMOS transistors 410, 690, 695, and 810, and resistor 820. Each component is described below in further detail.

As noted above, gate oxide integrity problem exists when the gate terminal of transistor 410 is pulled to 0V. To avoid gate oxide integrity problem, gate terminal of transistor 410 is maintained at a slightly higher voltage than 0V, as described below.

As shown, the gate terminal of transistor 810 is connected to the drain terminal of transistor 810. Resistor 820 is connected between the drain terminal of transistor 810 and supply voltage Vdd. Due to such a configuration, transistor 810 is in an on state, and the gate terminal is maintained at the threshold voltage (Vt) of transistor 810.

Due to the short between the drain terminal and the gate terminal of transistor 810, the voltage on path 812 is maintained to equal Vt, which is greater than 0 volts. As a result, gate oxide integrity problem is avoided/reduced. The description is continued with respect to the manner in which CHC problem is reduced according to an aspect of the present invention.

9. Reducing CHC Problem

Figure 9A:
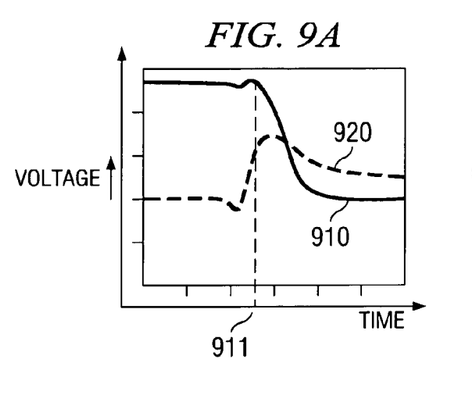
FIG. 9A is a timing diagram illustrating the manner in which channel hot carrier (CHC) problem could occur in transistors.

Broadly, the graph of FIG. 9A illustrates the manner in which the CHC problem (number 5) described above can occur, and FIG. 9B illustrates the manner in which CHC is reduced in an embodiment of the present invention. In both graphs, X-axis represents time and Y-axis represents voltage.

Continuing with reference FIG. 9A, lines 910 and 920 respectively represent Vgs and Vds of transistor 665 or 675. Time point 911 represents the instance at which the NMOS transistor starts transitioning from on to off state.

It may be observed that Vgs 910 is at high voltage until time point 911 and starts decreasing thereafter. When Vgs is high, NMOS transistor will turn on, which causes current to flow through source and drain terminals and thus line 920 (Vds) is of low value up to time point 911.

While switching from on to off, Vgs starts reducing and Vds starts increasing, which causes both Vgs and Vds to be at high voltage levels around time point 911. Such a situation causes carriers to be passed through gate oxide, causing a change in the threshold voltage in the long run, and is referred to as CHC problem. The manner in which the CHC problem is reduced is described below with reference to FIG. 9B.

Figure 9B:
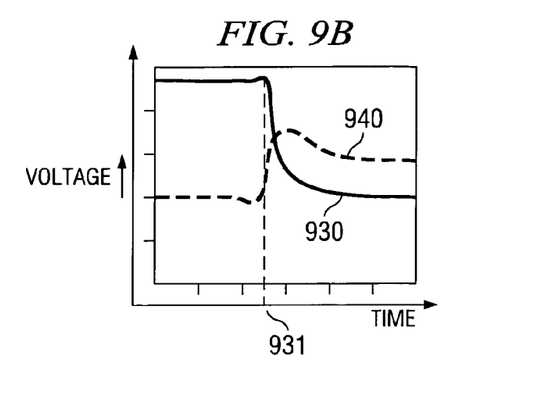
FIG. 9B is a timing diagram illustrating the manner in which the CHC problem is reduced according to an aspect of the present invention.

FIG. 9B illustrates the manner in which CHC problem is reduced according to an aspect of the present invention. Lines 930 and 940 represent Vgs and Vds respectively. Time point 931 represents the time instance at which the NMOS transistor starts transitioning from on to off state. The reduction of CHC is obtained by connecting series resistors 681 and 682, as depicted in FIG. 6.

When Vgs is high, current flows through the drain terminals of the corresponding transistors, which causes a voltage drop across resistors 681/682. Due to the voltage drop across the resistor, Vds also is correspondingly reduced. Thus, the rise of Vds is delayed and is shown at a low volume at time point 931, thereby avoiding the CHC problem.

10. Cross Talk

Figure 10:
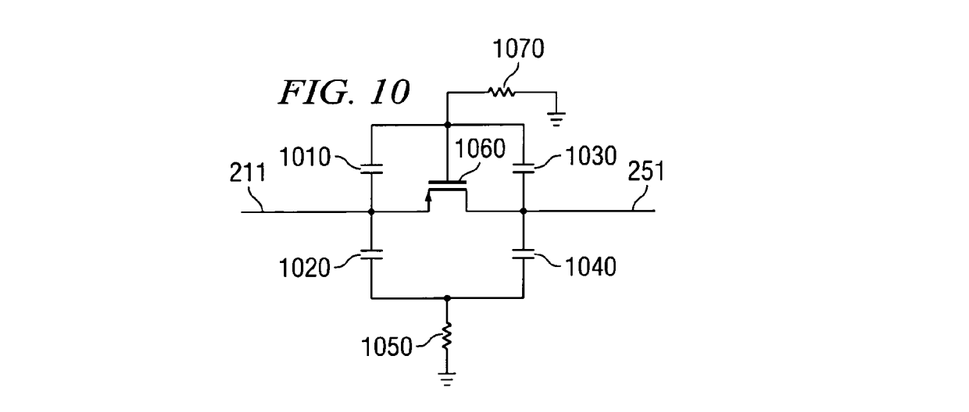
FIG. 10 is a block diagram illustrating the manner in which cross talk problem could occur due to switches in an off state.

FIG. 10 is a block diagram illustrating the cross-talk problem. The cross-talk problem occurs when a switch (one of 291–298) is in an off-state, but (undesirably) couples signals received on one terminal to another signal line connected to the switch output. For illustration, it is assumed that transceiver 130 of FIG. 2 is to be operated in a cross connection configuration, and thus switch 291 is to be switched off. It is further assumed that switch 291 contains transistor 1060.

Continuing with respect to FIG. 10, the source terminal of transistor 1060 is shown connected to path 211 and the drain terminal is connected to path 251. Capacitors 1010, 1020, 1030 and 1040 represent internal coupling capacitances between source and gate (terminals), source and bulk, gate and drain, and drain and bulk respectively. Resistors 1050 and 1070 respectively represent the bulk resistance and the gate resistance of transistor 1060.

Thus, even if transistor 1060 is in the off state, the path formed by capacitors 1010 and 1030 and the path formed by capacitors 1020 and 1040, couples the signal received on path 211 to path 251 (forming cross talk). Lower the values of resistors 1050 and 1070, lower the cross talk. Thus, care is taken in design and layout to reduce the resistance as far as possible. Even this may not reduce the cross talk below permissible limit. Hence the following techniques are adopted to overcome the problem. Similar problem may be presented with respect to switches 291–294 in the case of cross connection, and with switches 295–298 in the case of straight connection.

Cross talk is undesirable since the transmit signals interfere with the receive signals. The manner in which cross-talk is avoided in an embodiment of the present invention, is described below with respect to FIG. 11. The features canceling the cross talk can be appreciated in comparison to the operation with respect to FIG. 2. Accordingly, the connections and the sources of cross talk with respect to FIG. 2 are described first in further detail.

With reference to FIG. 2, it is assumed that paths 211/231 and 212/232 respectively carry the positive (tx+) and negative (tx−) transmit signals, and paths 221/241 and 222/242 receive the positive (rx+) and negative (rx−) receive signals in the case of straight connection. On the other hand, in cross connection, paths 211/231 and 212/232 respectively receive the positive (tx+) and negative (tx−) receive signals, and paths 221/241 and 222/242 carry the positive (rx+) and negative (rx−) transmit signals.

Port 221 receives tx+ through a path formed by switches 295 and 293, and also another path formed by switches 291 and 297. Port 222 receives tx− through a path formed by switches 296 and 294 and also another path formed by 292 and 298. Port 211 receives rx+ through a path formed by switches 295 and 293 and also another path formed by switches 291 and 297. Port 212 receives rx− through a path formed by switches 296 and 294 and also another path formed by switches 292 and 298.

From the above, it may be appreciated that each port receives the same signal through two different paths, and the cross-talk due to the off-switches is additive on each port. The techniques of FIG. 11 advantageously cancel the cross-talk from different paths connecting to each port, as described below in further detail.

Figure 11:
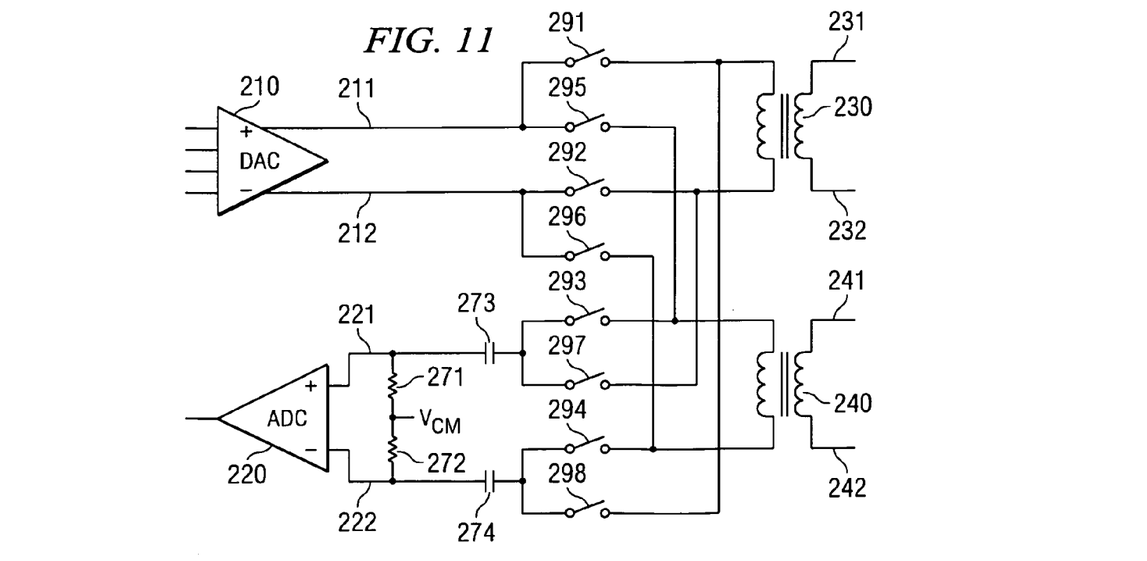
FIG. 11 is a block digram of a transceiver system illustrating the manner in which the cross-talk can be reduced according to an aspect of the present invention.

FIG. 11 is a block diagram of the internals of an embodiment of transceiver 130 illustrating the manner in which cross-talk is canceled according to an aspect of the present invention. The connections of FIG. 11 are compared to the connection of FIG. 2 to illustrate the advantages of the technique(s) of FIG. 11.

In FIG. 11, switch 297 is connected to switch 292 (as opposed to, to switch 291 in FIG. 2), and switch 298 is connected to switch 291 (as opposed to, to switch 292 in FIG. 2). Due to such connections, each port receives both and negative signals through two different paths, as described below.

Port 221 receives tx+ through a path formed by switches 295 and 293, and tx− through another path formed by switches 292 and 297. Port 222 receives tx− through a path formed by switches 296 and 294, and tx+ through another path formed by switches 291 and 298. Port 211 receives rx+ through a path formed by switches 295 and 293 and rx− through another path formed by switches 291 and 298. Port 212 receives rx− through a path formed by switches 296 and 294 and rx+ through another path formed by switches 292 and 297.

Due to the connection of both positive and negative signals (on different paths) to each port, the cross talk through off-switches in two different paths gets canceled. For example, in a straight connections, switches 295–298 are off. Switch 295 couples tx+ to port 221 (through switch 293, which is in an on state), and switch 297 couples tx− to the same port 221 (through switch 292, which is in an on state).

Since in a differential mode of operation, the swing of tx+ is ideally equal in magnitude and opposite in sign to that of tx−, the two crosstalk signals cancel each other (at port 221) provided the switches are identically implemented. However, in an embodiment, the size of transistors in switches 293, 294, 297 and 298 is less than the size of the transistors in switches 291, 292, 295, and 296 (since the Ron specification is less), and hence the cross talk is reduced (in comparison to FIG. 2), but not completely eliminated.

However, one problem with the configuration of FIG. 11, is that when in cross connection configuration, rx+ on pin 231 is connected to rx− input (path 222) of ADC 220, and rx− on pin 232 is connected to rx+ input (path 221) of ADC 220 (while it is generally required that rx+ signal be provided on rx+ input, and rx− signal be provided on rx− input). In one embodiment, ADC 220 generates values of opposite sign in such a cross connection, and appropriate corrections may be made, for example in software, while processing the output values. An alternative implementation is described below with reference to FIG. 12.

Figure 12:
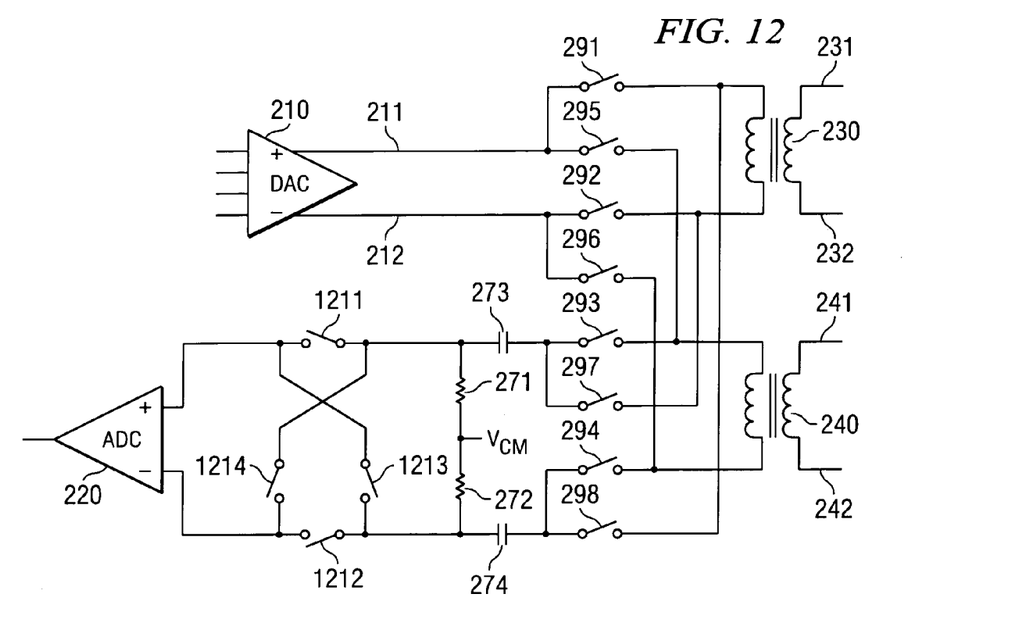
FIG. 12 is a block diagram of a transceiver system illustrating the manner in which inputs may be provided as desired by an ADC, while reducing the cross-talk problem.

FIG. 12 depicts switches 1211–1214 (operating as a flipping circuit) in addition to the components of FIG. 11. When operating in straight connection configuration, switches 1211 and 1212 are closed and switches 1213 and 1214 are opened, such that the output of capacitor 273 is connected to the rx+ input of ADC 220 and output of capacitor 274 is connected to rx− input of ADC 220. When operating in a cross connecting configuration, switches 1213 and 1214 are closed and switches 1211 and 1212 are opened, thereby ensuring that the rx+ signal is received on rx+ input of ADC 220 and rx− signal is received on rx− input of ADC 220.

As a result, ADC 220 would generate accurate digital values in both straight and cross connection configurations. The description is continued with respect to the manner in which problem 4 noted above is addressed by various aspects of the present invention.

11. Problem 4: Common Mode Reduction

Figure 13:
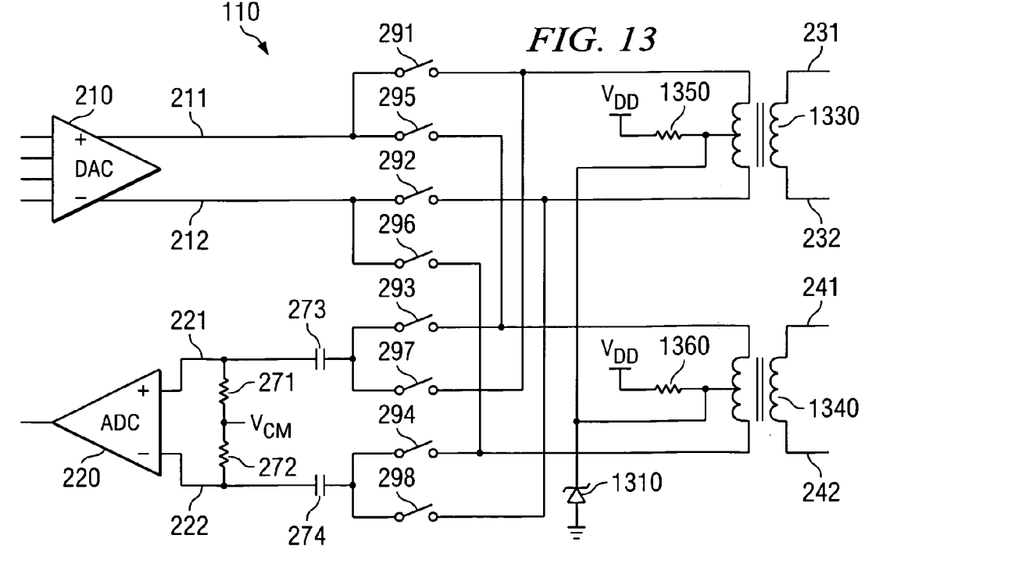
FIG. 13 is a block diagram illustrating the manner in which common mode voltage may be provided to ADCs and DACs contained in a transceiver system according to an aspect of the present invention.

Problem 4 is described briefly with reference to FIG. 2, and the manner in which various aspects of the present invention address the problem is described then with reference to FIG. 13. With respect to FIG. 2, problem 4 is described assuming that transceiver 130 is operating in straight connection configuration in which transformer 240 is receiving the signal from external sources. However, the description is applicable to transformer 230 as well, when transceiver 130 is operating in the cross-connect configuration.

With respect to FIG. 2, no current flows through resistor 260 and thus the voltage provided to switches 293, 294, 297 and 298 equals Vdd when no signal is received. When a signal with a high voltage swing is received, then switches would receive a signal having a voltage equaling (Vdd+the high voltage swing), which might cause cross terminal voltages (of transistors contained in the switches) exceeding the corresponding maximum permissible voltages to be applied (thereby damaging the transistors).

Accordingly, it may be appreciated that the absence of current flow in resistor 260 causes such application of high cross terminal voltages (when transformer 240 receives external/input signals). The circuit of FIG. 13 is implemented to overcome problem 4, based on such an appreciation.

FIG. 13 is a block diagram of the details of (relevant portions of) transceiver 130 illustrating the manner in which problem 4 may be addressed according to an aspect of the present invention. In comparison to FIG. 11, FIG. 13 is shown containing zener diode 1310 in addition, and transformers 1330 and 1340 and resistors 1350 and 1360 respectively replace transformers 230 and 240 and resistors 250 and 260. Only the differences from FIG. 11 are described in the interest of conciseness.

The center tap of transformer 1340 is shown connected to the center tap of transformer 1330. In addition, resistor 1350 is connected between the center tap of transformer 1330 and Vdd, and resistor 1360 is connected between the center tap of transformer 1340 and Vdd.

Due to such connections, the same amount of current would flow through resistors 1350 and 1360 (assuming the resistance of resistors 1350 and 1360 is equal). In one embodiment, each of resistors 1350 and 1360 has a resistance equaling twice the resistance of resistor 250 (or 260, assuming both resistors also have equal resistance).

Thus, in comparison with the operation in the straight connection example above with respect to FIG. 2, it may be appreciated that current flows through resistor 1360, while none flows through resistor 260 when no signal is received. Due to such current flow, there would be a voltage drop across resistor 1360, which causes a corresponding lesser voltage than Vdd to be applied as a signal to switches 293 and 294, thereby at least reducing the possibility that transistors contained in the switches are not exposed to unduly high voltages.

However, one problem with the above described components of FIG. 13 is that there might be situations in which transmitting circuit (containing path from DAC 210 to transformer 1330 in a straight configuration) is in an off state causing no current to flow through resistors 1350/1360. Problem 4 would appear again in such a situation.

Zener diode 1310 operates to ensure that the voltage on path 1314 does not exceed a desired voltage (e.g., specification of the low voltage transistor), in particular, in situations when the transmitting circuit is in the off state. Zener diode 1310 may be in an off state when the transmitting circuit is operational, thereby reducing the power consumption.

Thus, it may be appreciated that various aspects of the present invention enable auto-configuration of a transceiver to operate accurately irrespective of cable connection mismatches.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A transceiver comprising:
  an analog to digital converter (ADC) having an input path;
  a digital to analog converter (DAC) having an output path;
  a first pin and a second pin; and
  a plurality of switches configurable to connect said first pin to said input path and said second pin to said output path in a first configuration, and to connect said first pin to said output path and said second pin to said input path in a second configuration,
  whereby each of said first pin and said second pin can be coupled to either said input path or said output path.

2. The transceiver of claim 1, further comprising a control block controlling each of said plurality of switches to be either in an off state or an on state to obtain said first configuration or said second configuration.

3. The transceiver of claim 1, a first NMOS transistor is contained in a first switch comprised in said plurality of switches, the source terminal of said first NMOS transistor receiving an input signal, said transceiver further comprising a boost circuit connected between the source terminal and the gate terminal of said first NMOS transistor, said boost circuit providing a constant voltage substantially more than the threshold voltage of said first NMOS transistor and less than a maximum permissible cross terminal voltage of said first NMOS transistor.

4. The transceiver of claim 3, wherein said boost circuit comprises a capacitor which is charged to provide said constant voltage.

5. The transceiver of claim 4, further comprises a refresh circuit which periodically charges said capacitor to maintain said constant voltage.

6. The transceiver of claim 5, wherein said refresh circuit comprises:
  a ninth switch connected between a first terminal of said capacitor and ground, said ninth switch being connected to said first terminal at a first node;
  a tenth switch connected between a second terminal of said capacitor and a second node, said tenth switch being connected to said second terminal at a third node;
  an eleventh switch connected between said first node and said source terminal;
  a twelfth switch connected between said third node and said gate terminal,
  wherein said ninth switch and said tenth switch are closed and said eleventh switch and said twelfth switch are opened to charge said capacitor to said constant voltage in a first phase of a clock signal,
  wherein said ninth switch and said tenth switch are opened and said eleventh switch and said twelfth switch are closed to connect said capacitor between said gate terminal and said source terminal in a second phase of said clock signal.

7. The transceiver of claim 6, further comprising a thirteenth switch and a fourteenth switch, said thirteenth switch being connected between a supply voltage and said second node, said fourteenth switch being connected between said gate terminal and ground, wherein said thirteenth switch is set to closed state and said fourteenth switch is set to open state to close said first switch, and wherein said thirteenth switch is set to open state and said fourteenth switch is set to closed state to open said first switch.

8. The transceiver of claim 7, wherein said eleventh switch comprises:
  a second NMOS transistor, a third NMOS transistor and a fourth NMOS transistor,
  wherein the drain terminal of said second NMOS transistor is coupled to the source terminal of said first NMOS transistor,
  the source terminal of said second NMOS transistor is connected to said first node,
  the gate terminal of said second NMOS transistor is connected to each of the source terminal of said fourth NMOS transistor and the drain terminal of said third NMOS transistor,
  the source terminal of said third NMOS transistor is connected to ground,
  the drain terminal of said fourth NMOS transistor is connected to said third node,
  the gate terminal of said third NMOS transistor is connected to a first clock signal and the gate terminal of said fourth transistor is connected to a second clock signal, wherein said first clock signal is out-of-phase with said second clock signal by 180 degrees.

9. The transceiver of claim 8, wherein said twelfth switch comprises a fifth NMOS transistor, a sixth NMOS transistor, a seventh NMOS transistor, an eighth NMOS transistor, and a second capacitor,
  wherein the drain terminal of said fifth NMOS transistor is coupled to the gate terminal of said first NMOS transistor, the source terminal of said fifth NMOS transistor is connected to said third node, the gate terminal of said fifth NMOS transistor is connected to a fourth node, the source terminal of said sixth NMOS transistor is connected to said third node, the drain terminal of said sixth NMOS transistor is connected to a fifth node, and the drain terminal of said seventh NMOS transistor is connected to said fifth node, the source terminal of said seventh NMOS transistor is connected to ground, the drain terminal of said eighth NMOS transistor is connected to said fourth node, the source terminal of said eighth NMOS transistor is connected to said supply voltage,
  the gate terminal of said sixth transistor receiving said second clock signal and the gate terminal of said seventh transistor receives said first clock signal, said second capacitor is connected between said fourth node and said fifth node.

10. The transceiver of claim 9, wherein the gate terminal of said eighth transistor receives a third clock signal, wherein said third clock signal is in same phase as said first clock signal,
wherein said first clock signal swings between 0 and supply voltage,
said second clock signal swings between 0 and twice of said supply voltage, and
said third clock signal swings between said supply voltage and twice of said supply voltage.

11. The transceiver of claim 10, wherein each of said ninth switch and said tenth switch is implemented using a single NMOS transistor, and said thirteenth switch is implemented using a single PMOS transistor.

12. The transceiver of claim 10, wherein said fourteenth switch comprises:
a ninth NMOS transistor and a tenth NMOS transistor,
wherein the drain terminal of said ninth NMOS transistor is connected to the gate terminal of said first NMOS transistor and the source terminal of said ninth NMOS transistor is connected to the drain terminal of said tenth NMOS transistor,
the gate terminal of said tenth NMOS transistor receives a signal which indicates whether said first switch is to be turned off or on, the gate terminal of said ninth NMOS transistor is connected to supply voltage.

13. The transceiver of claim 12, further comprises:
an eleventh transistor and a first resistor, wherein the drain terminal of said eleventh transistor is connected to a sixth node, the source terminal of said eleventh transistor is connected to ground, and the gate terminal of said eleventh transistor is connected to the drain terminal of said eleventh transistor, and said first resistor is connected between said sixth node and said supply voltage, and the source terminal of said tenth transistor is connected to said sixth node.

14. The transceiver of claim 10, further comprises:
a second resistor connected between the drain terminal of said second NMOS transistor and the source terminal of said first NMOS transistor; and
a third resistor connected between the drain terminal of said fifth NMOS transistor and the gate terminal of said first NMOS transistor.

15. The transceiver of claim 1, further comprising:
a first pair of pins containing said first pin and a third pin; and
a second pair of pins containing said second pin and a fourth pin;
said output path comprising a first transmit port and a second transmit port, wherein said DAC generates differential signals on said first transmit port and said second transmit port,
said input path comprising a first receive port and a second receive port, said ADC receives differential signals on said first receive port and said second receive port,
wherein said plurality of switches comprise a first switch, a second switch, a third switch, a fourth switch, a fifth switch, a sixth switch, a seventh switch, and an eighth switch,
wherein said first switch is coupled between said first transmit port and said first pin,
wherein said second switch is coupled between said second transmit port and said third pin,
wherein said third switch is coupled between said first receive port and said second pin,
wherein said fourth switch is coupled between said second receive port and said fourth pin,
wherein said fifth switch is coupled between said first transmit port and said second pin,
wherein said sixth switch is coupled between said second transmit port and said fourth pin,
wherein said seventh switch is coupled between said first receive port and said third pin, and
wherein said eighth switch is coupled between said second receive port and said first pin.

16. The transceiver of claim 15, wherein said ADC comprises a positive input path and a negative input path, said transceiver circuit further comprises a flipping circuit which couples said first receive port to said positive input path and said second receive port to said negative input path in one of said first configuration and second configuration, and couples said first receive port to said negative input path and said second receive port to said positive input path in the other one of said first configuration and second configuration.

17. The transceiver of claim 15, further comprising:
a third capacitor connected between said first receive port and each of said third switch and said seventh switch; and
a fourth capacitor connected between said second receive port and each of said fourth switch and said eighth switch.

18. The transceiver of claim 17, further comprising:
a fourth resistor and a fifth resistor connected in series between said first receive port and said second receive port, wherein a first common mode voltage is provided at a junction of said fourth resistor and said fifth resistor.

19. The transceiver of claim 18, further comprising:
a first transformer coupled to said first pin and said third pin on one side, said first transformer being coupled to said first switch and said second switch on another side in one of said first configuration and second configuration, said first transformer being coupled to said seventh switch and said eighth switch on another side in the other one of said first configuration and second configuration; and
a second transformer coupled to said second pin and said fourth pin on one side, said second transformer being coupled to said third switch and said fourth switch on another side in one of said first configuration and second configuration, said second transformer being coupled to said fifth switch and said sixth switch on another side in the other one of said first configuration and second configuration.

20. The transceiver of claim 19, further comprising:
a sixth resistor connected between a center tap of said first transformer and supply voltage; and
a seventh resistor connected between a center tap of said second transformer and supply voltage,
wherein the center taps of said first transformer and said second transformer are connected to each other.

21. The transceiver of claim 20, wherein the resistance of said sixth resistor equals the resistance of said seventh resistor.

22. The transceiver of claim 21, further comprising a zener diode connected at one end to said center taps and to ground at the other end.

23. A device comprising:
a processing unit generating a first digital data, and processing a second digital data; and
a transceiver receiving said first digital data and transmitting said first digital data, said transceiver receiving an input signal and generating said second digital data, said transceiver comprising:
an analog to digital converter (ADC) having an input path;
a digital to analog converter (DAC) having an output path;
a first pin and a second pin; and
a plurality of switches configurable to connect said first pinto said input path and said second pin to said output path in a first configuration, and to connect said first pin to said output path and said second pin to said input path in a second configuration,
whereby each of said first pin and said second pin can be coupled to either said input path or said output path.

* * * * *